United States Patent
Seok

(10) Patent No.: US 9,258,817 B2
(45) Date of Patent: Feb. 9, 2016

(54) DIRECT LINK SETUP METHOD AND CHANNEL ALLOCATION METHOD IN MULTI-CHANNEL WIRELESS COMMUNICATION NETWORK

(75) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 931 days.

(21) Appl. No.: 12/991,587

(22) PCT Filed: Apr. 23, 2009

(86) PCT No.: PCT/KR2009/002133
§ 371 (c)(1),
(2), (4) Date: Nov. 30, 2010

(87) PCT Pub. No.: WO2009/136701
PCT Pub. Date: Nov. 12, 2009

(65) Prior Publication Data
US 2011/0090821 A1    Apr. 21, 2011

(30) Foreign Application Priority Data
May 9, 2008 (KR) .......... 10-2008-0043669

(51) Int. Cl.
H04W 72/04 (2009.01)
H04W 76/02 (2009.01)
H04W 76/04 (2009.01)

(52) U.S. Cl.
CPC .......... *H04W 72/044* (2013.01); *H04W 76/025* (2013.01); *H04W 76/043* (2013.01); *H04W 72/042* (2013.01); *H04W 72/0413* (2013.01); *H04W 76/02* (2013.01)

(58) Field of Classification Search
None
See application file for complete search history.

(56) References Cited

U.S. PATENT DOCUMENTS

| 2005/0036469 A1* | 2/2005 | Wentink .......... 370/338 |
| 2005/0088980 A1* | 4/2005 | Olkkonen et al. .......... 370/255 |
| 2007/0104138 A1 | 5/2007 | Rudolf et al. |
| 2009/0073945 A1* | 3/2009 | Seok .......... 370/338 |

OTHER PUBLICATIONS

Seongkwan Kim et al., "A High-Throughput MAC Strategy for Next-Generation WLANs", Proceedings of the Sixth IEEE International Symposium on a World of Wireless Mobile and Multimedia Networks (WoWMoM'05), Jun. 13-16, 2005, pp. 278-285.
Yong Ho Seok, "Standard trends of Direct Link Setup (DSL)", IT Standard Weekly, Nov. 5, 2007.
IEEE Computer Society, "IEEE Standard for Information technology . . . ," Part 11: Wireless LAN Medium Access Control (MAC) and Physical Layer (PHY) Specifications, Amendment 5: Enhancements for Higher Throughput, 802.11n, Oct. 29, 2009, pp. 67-76.

* cited by examiner

*Primary Examiner* — Jackie Zuniga Abad
(74) *Attorney, Agent, or Firm* — Birch, Stewart, Kolasch & Birch, LLP

(57) ABSTRACT

Provided are a direct link setup procedure and a channel allocation mechanism in a multi-channel wireless communication network. The method includes transmitting a direct link setup request message comprising request information for specifying one or more channels, each of which desires to set up a direct link, among multiple channels, and receiving a direct link setup response message comprising response information for setting up the direct link to one or more channels in response to the direct link setup request message.

6 Claims, 3 Drawing Sheets

Fig. 5

| Ch 1 | Ch 2 |
|---|---|
| PPDU1 | PPDU2 |
| PPDU3 | PPDU4 |

DIRECT LINK SETUP METHOD AND CHANNEL ALLOCATION METHOD IN MULTI-CHANNEL WIRELESS COMMUNICATION NETWORK

TECHNICAL FIELD

The present invention relates to wireless communications, and more particularly, to a direct link setup procedure and a channel allocation mechanism in a multi-channel wireless communication network.

BACKGROUND ART

With the advancement of information communication technologies, various wireless communication technologies have recently been developed. Among the wireless communication technologies, a wireless local area network (WLAN) is a technology whereby super high-speed Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared ray communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g realizes the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data throughput of up to 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicated copies to increase data reliability and also may use the OFDM to increase speed.

Meanwhile, for effective channel use, the IEEE 802.11 standard specifies direct communication between mobile stations. For example, the IEEE 802.11e specifies a direct link setup (DLS) procedure for direct communication between stations (STAs) supporting quality of service (QoS). Recently, a tunneled DLS (TDLS) procedure is also specified to support setting up of a direct link between QoS STAs (QSATs) even if an access point (AP) is a legacy AP not supporting QoS.

DISCLOSURE OF INVENTION

Technical Problem

With the widespread use of a wireless local area network (WLAN) and the diversification of applications using the WLAN, there is a growing demand on a new WLAN system for supporting a higher throughput than a data throughput supported by the institute of electrical and electronics engineers (IEEE) 802.11n. However, an IEEE 802.11n medium access control (MAC)/physical layer (PHY) protocol is not effective to provide a throughput of 1 Gbps or above. This is because the IEEE 802.11n MAC/PHY protocol is devised for an operation of a single station (STA), i.e., an STA having one network interface card (NIC), and thus when a frame throughput increases while maintaining the conventional IEEE 802.11n MAC/PHY protocol, the increase in the throughput results in the increase in an additional overhead. Therefore, there is a limit when a throughput of a wireless communication network increases while maintaining the conventional IEEE 802.11n MAC/PHY protocol, i.e., a single STA architecture.

To achieve a data throughput of 1 GHz or above in the wireless communication system, there is a need for a new very high throughput (VHT) system and a protocol thereof which are different from those of the conventional single STA architecture, i.e., the IEEE 802.11n MAC/PHY protocol. In addition, the new protocol needs to support a direct link setup (DLS) procedure for ensuring direct communication between mobile stations in the new VHT system.

Accordingly, the present invention provides a DLS or tunneled DLS (TDLS) procedure for supporting direct communication between mobile stations in a wireless communication network supporting a VHT.

The present invention also provides a DLS procedure or a TDLS procedure for all or some of radio interfaces between mobile stations including a plurality of network interface cards (NICs) each having an independent radio interface.

The present invention also provides a method of mapping a physical layer convergence procedure (PLCP) protocol data unit (PPDU) to a subchannel of a channel set when two or more channel sets are used by respective radio interfaces.

Technical Solution

According to an aspect of the present invention, a direct link setup method in a multi-channel wireless communication system, comprising: transmitting a direct link setup request message comprising request information for specifying one or more channels, each of which desires to set up a direct link, among multiple channels; and receiving a direct link setup response message comprising response information for setting up the direct link to one or more channels in response to the direct link setup request message.

Wherein the request information and the response information are included in a direct link mode information element or a direct link field; and wherein the direct link setup request message and the direct link setup response message comprise the direct link mode information element or the direct link field.

Wherein the direct link setup request message is a direct link setup (DLS) setup request frame or a tunneled DLS (TDLS) setup request frame, and the direct link setup response message is a DLS setup response frame or a TDLS setup response frame.

According to another aspect of the present invention, a direct link setup method in a multi-channel wireless communication system, wherein the multi-channel wireless communication system selectively sets up a direct link to some or all of the multiple channels between mobile stations.

According to still another aspect of the present invention, A physical layer convergence procedure (PLCP) protocol data unit (PPDU) channel allocation method of an associated channel in a multi-channel wireless communication network, wherein the PPDU is allocated to each of subchannels constituting the association channel.

Wherein the subchannels constituting the associated channel have different radio properties.

Wherein an error correction code is differently applied according to the subchannels allocated to the PPDU.

Advantageous Effects

According to embodiments of the present invention, there is provided a direct link setup (DLS) or tunneled DLS (TDLS) procedure for supporting direct communication between mobile stations in a wireless communication system supporting a very high throughput (VHT). Further, a direct link can be set up for all or some of radio interfaces between mobile stations including a plurality of network interface cards (NICs) each having an independent radio interface. Furthermore, a physical layer convergence procedure (PLCP) protocol data unit (PPDU) can be mapped to a subchannel of a channel set when two or more channel sets are used by respective radio interfaces.

BRIEF DESCRIPTION OF DRAWINGS

FIG. 4 and FIG. 5 are diagrams showing examples of a channel allocation method for a physical layer convergence procedure (PLCP) PDU (PPDU) when two or more channel sets are present, wherein FIG. 4 shows a case where the PPDU is allocated throughout all channel sets, and FIG. 5 shows a case where the PPDU is allocated to each subchannel of the channel set.

MODE FOR THE INVENTION

Hereinafter, exemplary embodiments of the present invention will be described in detail with reference to the accompanying drawings. Although a wireless local area network (WLAN) system will be described as an example in the embodiments described below among wireless communication systems, this is for exemplary purposes only. Therefore, the following embodiments of the present invention can equally apply to other wireless communication systems in addition to the WLAN system unless it is not allowed by nature. Terms or words used in the following embodiments are unique to the WLAN system, but may be modified to other suitable terms or words customarily used in the WLAN system.

Figure 1:
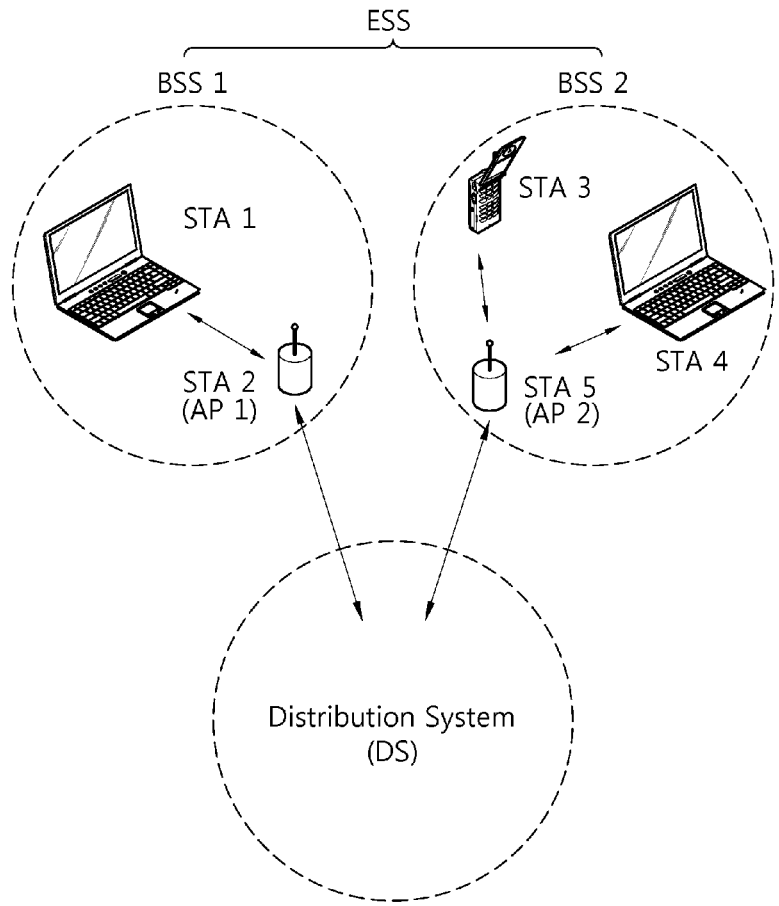
FIG. 1 is a schematic view showing an exemplary structure of a wireless local area network (WLAN) system according to an embodiment of the present invention.

FIG. 1 is a schematic view showing an exemplary structure of a WLAN system according to an embodiment of the present invention.

Referring to FIG. 1, the WLAN system includes one or more basis service sets (BSSs). The BSS is a set of stations (STAs) which are successfully synchronized to communicate with one another, and is not a concept indicating a specific region. A very high throughput (VHT)-BSS is defined as a BSS that supports a super high-speed data throughput greater than or equal to 1 GHz in a multi-channel environment to be described below.

The BSS can be classified into an infrastructure BSS and an independent BSS (IBSS). The infrastructure BSS is shown in FIG. 1. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer (PHY) interface conforming to the institute of electrical and electronics engineers (IEEE) 802.11 standard, and includes both an AP and a non-AP STA in a broad sense. A VHT-STA is defined as an STA that supports the super high-speed data throughput greater than or equal to 1 GHz in the multi-channel environment to be described below.

The STA for wireless communication includes a processor and a transceiver, and also includes a user interface, a display element, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4) are portable terminals operated by users. A non-AP STA may be simply referred to as an STA. The non-AP STA may also be referred to as a wireless transmit/receive unit (WTRU), a user equipment (UE), a mobile station (MS), a mobile terminal, a mobile subscriber unit, etc. A non-AP VHT-STA is defined as a non-AP STA that supports the super high-speed data throughput greater than or equal to 1 GHz in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT- AP or a MAC service access point (MAC SAP) is defined as an AP that supports the super high-speed data throughput greater than or equal to 1 GHz in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no restriction on its format as long as a specific distribution service specified in the IEEE 802.11 can be provided. For example, the DS may be a wireless network such as a mesh network, or may be a physical structure for interconnecting APs.

Figure 2:
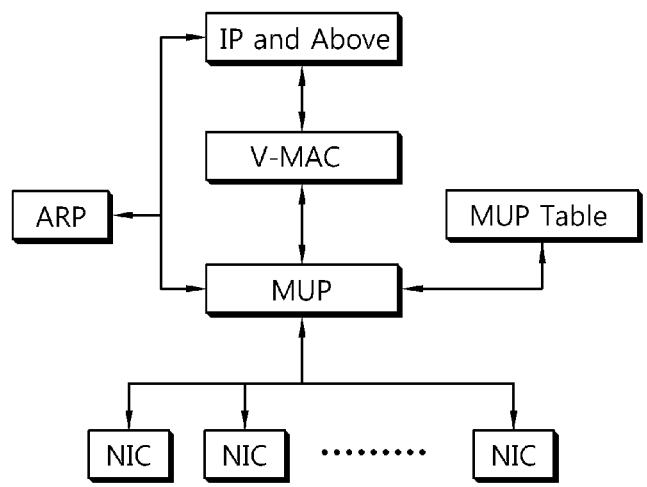
FIG. 2 is a block diagram showing a multi-radio unification protocol (MUP) as an example of a protocol applicable to a very high throughput (VHT) system including a plurality of network interface cards (NICs) each having an independent radio interface.

FIG. 2 is a block diagram showing a multi-radio unification protocol (MUP) as an example of a protocol applicable to a very high throughput (VHT) system including a plurality of network interface cards (NICs) each having an independent radio interface. The VHT system is one of systems for a multi-channel wireless communication network aiming at providing a throughput of 1 Gbps or above in a MAC SAP.

Referring to FIG. 2, an STA supporting the MUP includes a plurality of NICs. The NICs are separately depicted in FIG. 2, which implies that each NIC independently operates a MAC/PHY module. That is, the NICs are distinctively depicted in FIG. 2 to show that the NICs are logical entities operating according to individual MAC/PHY protocols. Therefore, the plurality of NICs can be implemented with physically distinctive functional entities, or can be implemented by integrating the physical entities into one physical entity.

According to one aspect of the present embodiment, the plurality of NICs can be classified into a primary radio interface and one or more secondary radio interfaces. If a plurality of secondary radio interfaces are present, the secondary radio interfaces can also be classified into a first secondary radio interface, a second secondary radio interface, a third secondary radio interface, etc. The classification into the primary interface and the secondary interface and/or the classification of the secondary ratio interface itself may be determined by a policy or may be adoptively determined in consideration of a channel environment.

The plurality of NICs are integrally managed according to the MUP. As a result, the plurality of NICs are externally recognized as if they are one device. For this, the VHT system includes a virtual-MAC (V-MAC). Through the V-MAC, an upper layer cannot recognize that a multi-radio channel is operated by the plurality of NICs. As such, in the VHT system, the upper layer does not recognize the multi-radio channel through the V-MAC. This means that one virtual Ethernet address is provided.

Next, a direct link setup (DLS) procedure in a wireless communication system supporting a VHT service will be described according to an embodiment of the present invention. In the present embodiment, a direct link is set up between VHT-STAs. Each VHT-STA has at least two multi-radio interfaces. Each radio interface implies an independent MAC/PHY module, and has an independent channel set. The 'channel set' implies that each radio interface uses one or more channels. Channels specified in the channel set are contiguous in general. However, the present embodiment can also apply to a non-contiguous channel set.

Figure 3:
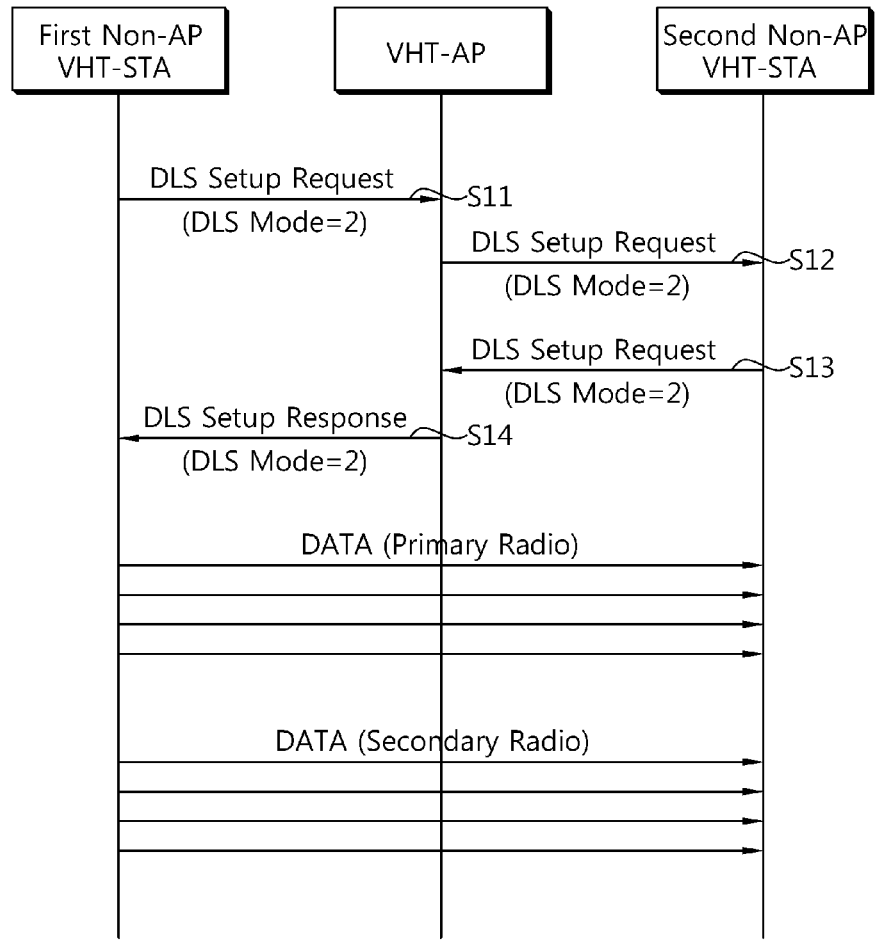
FIG. 3 is a message flow diagram showing a direct link setup (DLS) procedure according to a first embodiment of the present invention.

FIG. 3 is a message flow diagram showing a DLS procedure according to a first embodiment of the present invention. A BSS of the present embodiment is a BSS supporting a VHT system, i.e., a VHT-BSS. This is a case where a first non-AP VHT-STA and a second non-AP VHT-STA, each having a plurality of radio interfaces, perform the DLS procedure on two radio channel sets (i.e., a first channel set corresponding to a primary radio interface and a second channel set corresponding to a secondary radio interface). However, the present embodiment is not limited thereto, and thus can also apply to a case where the DLS procedure is performed on three or more radio channel sets.

According to the present embodiment, the primary radio interface and the secondary radio interface of the respective first and second non-AP VHT-STAs are both connected to a VHT-AP. That is, the first and second non-AP VHT-STAs perform an association procedure with the VHT-AP on both of the two radio interfaces. There is no restriction on a method of performing the association procedure on two or more radio interfaces between the non-AP VHT-STA and the VHT-AP since the method is irrelevant to technical features of the present invention.

However, according to the present embodiment, in the case of the DLS procedure, a direct link can be selectively set up for each radio interface. More specifically, the non-AP VHT-STA may allow the direct link to be set up only for the primary radio interface or may allow the direct link to be set up only for the secondary radio interface or may allow the direct link to be set up for both the primary radio interface and the secondary radio interface.

For this, a specific information element (IE) may be included in a frame exchanged to set up the direct link, or a specific field may be additionally included in an existing frame. For example, the IE may be a DLS mode IE or a DLS mode field. A DLS mode indicates a radio interface for which the direct link is intended to be set up. That is, the DLS mode indicates a specific radio interface for which the direct link is intended to be set up among a plurality of radio interfaces.

There is no restriction on a method of setting a value in the DLS mode IE or the DLS mode field. For example, the DLS mode IE may be set to a predetermined value for each radio interface so as to indicate a specific radio interface for which the direct link is intended to be set up, or may be set to a value indicating the number of radio interfaces for which the direct link is intended to be set up.

As shown in FIG. 3, assume that two types of radio interfaces, i.e., the primary radio interface and the secondary radio interface, are provided. In this case, for example, the direct link may be set up only for the primary radio interface if a value set in the DLS mode IE is '0', the direct link may be set up only for the secondary radio interface if the value set in the DLS mode IE is '1', and the direct link may be set up for both the primary radio interface and the secondary radio interface if the value set in the DLS mode IE is '2'.

Now, the DLS procedure will be described in detail with reference to FIG. 3.

Referring to FIG. 3, a first non-AP VHT-STA transmits a message for requesting setting up of a direct link with a second non-AP VHT-STA, e.g., a DLS setup request frame, to a VHT-AP (step S11). In this case, a DLS mode field of the DLS setup request frame is set to a value '2', which implies that the direct link is intended to be set up for both the primary radio interface and the secondary radio interface.

If the request from the first non-AP VHT-STA can be permitted, the VHT-AP transmits a DLS setup request frame to the second non-AP VHT-STA (step S12). A DLS mode of the DLS setup request frame is also set to '2'.

If the second non-AP VHT-STA intends to set up a direct link for both the primary radio interface and the secondary radio interface, the second non-AP VHT-STA transmits a DLS setup response frame to the VHT-AP in response to the DLS setup request frame (step S13). In this case, a DLS mode of the DLS setup response frame is also set to '2'. If the second non-AP VHT-STA intends to set up the direct link only for any one of the two radio interfaces, the DLS mode may be set to another value other than '2', e.g., may be set to '0' or '1'. Subsequently, the VHT-AP transmits a DLS setup response frame to the first non-AP VHT-STA according to a specific procedure (step S14). A DLS mode of the DLS setup response frame is also set to '2'.

After completion of the DLS procedure, the first non-AP VHT-STA and the second non-AP VHT-STA transmit data frames through the setup direct link. In this case, the first non-AP VHT-STA and the second non-AP VHT-STA may use any one of the primary radio interface and the secondary radio interface or may use both of the two radio interfaces to transmit the data frames.

The embodiment described above is about the case of contiguous channel set. However, of non-contiguous channel set can be also applied to the embodiment of the present invention.

The First Non-AP VHT-STA operates in Channel 1 and Second Non-AP VHT-STA operates in Channel 2. Wherein the Channel 1 and Channel 2 are not contiguous. As the DLS setup procedure successfully performed, the first non-AP VHT-STA and the second non-AP VHT-STA transmit data each other through the common channel. The common channel may be negotiated in the DLS setup procedure.

Specifically, VHT AP STA receives DLS Setup Request frame from the first Non-AP VHT-STA on the channel 1 and transmits the DLS Setup Request frame to the second Non-AP VHT-STA on Channel 2.

Then VHT AP STA receives DLS Setup Response frame from the second Non-AP VHT-STA on channel 2, and transmits DLS Setup Response frame to the first Non-AP VHT-STA on Channel 1, wherein the information of the common channel negotiated in the DLS procedure is included in the DLS Setup Request frame and the DLS Setup Response frame.

Next, a DLS procedure will be described according to a second embodiment of the present invention. The DLS procedure according to the second embodiment of the present invention is a case where a BSS is a legacy BSS not supporting a VHT system. That is, according to the present embodiment, two non-AP STAs for setting up a direct link are a first non-AP VHT-STA and a second non-AP VHT-STA having a VHT system including a plurality of radio interfaces, and an AP does not include the VHT system.

According to the present embodiment, a primary radio interface of each of the first and second non-AP VHT-STAs is connected to a legacy AP. That is, the first and second non-AP VHT-STAs perform an association procedure with the legacy AP on only the primary radio interface, but cannot perform the association procedure with the legacy AP on a secondary radio interface. There is no restriction on a method of performing the association procedure on the primary radio interface between the non-AP VHT-STA and the legacy-AP since the method is irrelevant to technical features of the present invention.

According to the present embodiment, the DLS procedure is also performed only on the primary radio interface associated with the legacy AP. More specifically, a non-AP VHT-STA sets up a direct link to the primary radio interface according to a conventional DLS procedure. If the legacy AP is a device supporting the conventional DLS procedure (e.g., IEEE 802.11e), the non-AP VHT-STA performs the DLS procedure on the primary radio interface according to the conventional DLS procedure. On the other hand, if the legacy AP is a device not supporting the conventional DLS procedure (e.g., IEEE 802.11e), the non-AP VHT-STA performs the DLS procedure according to a tunneled direct link setup (TDLS) procedure (e.g., IEEE 802.11z).

According to one aspect of the present embodiment, the secondary radio interface can perform the DLS procedure by utilizing another channel set (e.g., the aforementioned primary radio interface). For example, regarding the primary radio interface associated with the legacy AP, the DLS or TDLS procedure may be performed not on the primary radio interface but on the secondary radio interface or may be performed on both the primary radio interface and the secondary radio interface. In the former case, while communicating with the legacy AP by using the primary radio interface, the non-AP VHT STA can exchange data by utilizing the secondary radio interface through a direct link which is set up to a peer non-AP VHT-STA.

For this, a specific information element (IE) may be included in a frame exchanged to set up the direct link, or a specific field may be additionally included in an existing frame. For example, the IE may be a DLS mode IE or a DLS mode field. A DLS mode indicates a radio interface for which a direct link is intended to be set up. That is, the DLS mode indicates a specific radio interface for which the direct link is intended to be set up among a plurality of radio interfaces.

According to another aspect of the present embodiment, in order to set up a direct link for the secondary radio interface, the Non-AP VHT-STA can perform the TDLS procedure by exchanging a TDLS setup request frame/TDLS setup response frame/TDLS confirm frame through the primary radio interface. In this case, a channel set for the secondary radio interface has to be specified in the TDLS request, the TDLS response, etc. There is no restriction on a method of specifying the channel set with respect to the secondary radio interface.

In the aforementioned two embodiments, if two or more channel sets are used in each radio interface, i.e., if two or more subchannels constituting the subchannel is a continuous bonding channel, a MAC protocol data unit (MPDU) transmitted by a MAC entity can be mapped to each subchannel. For example, if two subchannels of 20 MHz are grouped and respectively allocated to the radio interfaces of a channel of 40 MHz, MPDUs generated by the MAC entity are delivered through a channel of 20 MHz.

Figure 4:
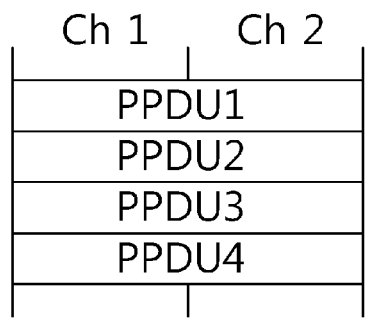
Figure 5:
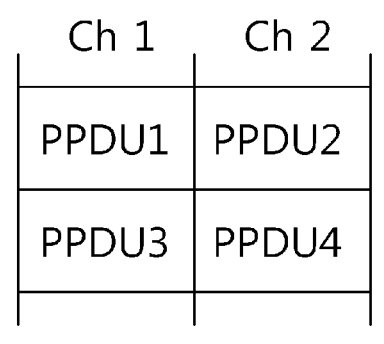

FIG. 4 and FIG. 5 are diagrams showing examples of a channel allocation method for a physical layer convergence procedure (PLCP) PDU (PPDU) when two or more channel sets are present. Herein, FIG. 4 shows a case where the PPDU is allocated throughout all channel sets, and FIG. 5 shows a case where the PPDU is allocated to each subchannel of the channel set. In a multi-channel wireless communication network according to an embodiment of the present invention, the channel allocation mechanism of FIG. 5 is more desirable than that of FIG. 4. The reason above will be described below.

If any one of two subchannels Ch1 and Ch2 in a neighboring legacy BSS is in use, e.g., if the second channel Ch2 is in use, the two subchannels show different radio properties (i.e., channel quality). In a case of the example of FIG. 4 in which all PPDUs are allocated throughout all channel sets, an error rate of the PPDUs is significantly affected by the second channel Ch2. That is, an error rate increases in all PPDUs to be transmitted.

To solve this problem, the PPDUs to be transmitted through different subchannels are preferably transmitted after being segmented according to the number of subchannels. In this case, although a PPDU transmitted through the second subchannel Ch2 experiences an increased error rate, a PPDU transmitted through the first subchannel Ch1 has a high probably of successful transmission. That is, according to the method of FIG. 4, an error may occur in all PPDUs (i.e., 4 PPDUs) to be transmitted, whereas according to the method of FIG. 5, there is a high probability that an error occurs in only two out of the four PPDUs.

According to one aspect of the present embodiment, to solve a problem of a high error rate in the PPDU transmitted through the second subchannel Ch2, a forward error correction (FEC) code applied to the PPDU, e.g., a low-density parity-check (LDPC) code, a Reed Solomon code, etc., may be differently applied according to a subchannel through which the PPDU is transmitted. For example, relatively large amount of FEC codes may be allocated to a subchannel having a high transmission error rate.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for establishing a Tunneled Direct Link Setup (TDLS) in a wireless communication system, the method comprising:
    performing, by a requesting station, an association procedure with an access point (AP) to join a basic service set (BSS) of the AP;
    transmitting, by the requesting station, to a responding station in the BSS, a TDLS setup request message through the AP to establish a TDLS direct link;
    receiving, by the requesting station, from the responding station, a TDLS setup response message through the AP as a response to the TDLS setup request message,
    wherein the TDLS setup request message and TDLS setup response message are encapsulated as data frames in order to allow the TDLS setup request message and TDLS setup response message to be transmitted through the AP transparently,
    wherein the TDLS setup request message includes a first mode field indicating whether the requesting station supports that a bandwidth of the TDLS direct link is wider than a bandwidth of the BSS,
    wherein the TDLS setup response message includes a second mode field indicating whether the responding station supports that the bandwidth of the TDLS direct link is wider than the bandwidth of the BSS, and
    wherein the bandwidth of the TDLS direct link is used for communication between the requesting station and the responding station via the TDLS direct link and the bandwidth of the BSS is used for communication between the AP and the requesting station or between the AP and the responding station; and
    only if both the first mode field and the second mode field indicate that a corresponding station supports that the bandwidth of the TDLS direct link is wider than the bandwidth of the BSS, communicating, by the requesting station, with the responding station via a wider bandwidth on the TDLS direct link than on the BSS.

2. The method of claim 1, wherein the first mode field or the second mode field is set to one to indicate that a corresponding station supports that the bandwidth of the TDLS direct link is wider than the bandwidth of the BSS, and the first mode field or the second mode field is set to zero to indicate that the corresponding station does not support that the bandwidth of the TDLS direct link is wider than the bandwidth of the BSS.

3. The method of claim 1, further comprising:
    transmitting, by the requesting station, to the responding station, a TDLS Setup confirm message to confirm a receipt of the TDLS setup response message.

4. A device configured for establishing a Tunneled Direct Link Setup (TDLS) in a wireless communication system, the device comprising:
    a transceiver; and
    a processor operatively coupled with the transceiver and configured to:
    instruct the transceiver to perform an association procedure with an access point (AP) to join a basic service set (BSS) of the AP;
    instruct the transceiver to transmit, to a responding station in the BSS, a TDLS setup request message through the AP to establish a TDLS direct link;
    instruct the transceiver to receive, from the responding station, a TDLS setup response message through the AP as a response to the TDLS setup request message,
    wherein the TDLS setup request message and TDLS setup response message are encapsulated as data frames in order to allow the TDLS setup request message and TDLS setup response message to be transmitted through the AP transparently,
    wherein the TDLS setup request message includes a first mode field indicating whether the device supports that a bandwidth of the TDLS direct link is wider than a bandwidth of the BSS,
    wherein the TDLS setup response message includes a second mode field indicating whether the responding station supports that the bandwidth of the TDLS direct link is wider than the bandwidth of the BSS, and
    wherein the bandwidth of the TDLS direct link is used for communication between the requesting station and the responding station via the TDLS direct link and the bandwidth of the BSS is used for communication between the AP and the requesting station or between the AP and the responding station; and
    instruct the transceiver to communicate with the responding station via a wider bandwidth on the TDLS direct link than on the BSS only if both the first mode field and the second mode field indicate that a corresponding station supports that the bandwidth of the TDLS direct link is wider than the bandwidth of the BSS.

5. The device of claim 4, wherein the first mode field or the second mode field is set to one to indicate that a corresponding station supports that the bandwidth of the TDLS direct link is wider than the bandwidth of the BSS, and the first mode field or the second mode field is set to zero to indicate that the corresponding station does not support that the bandwidth of the TDLS direct link is wider than the bandwidth of the BSS.

6. A method for establishing a Tunneled Direct Link Setup (TDLS) in a wireless communication system, the method comprising:

performing, by a responding station, an association procedure with an access point (AP) to join a basic service set (BSS) of the AP;

receiving, by the responding station, from a requesting station in the BSS, a TDLS setup request message through the AP to establish a TDLS direct link;

transmitting, by the responding station, to the requesting station, a TDLS setup response message through the AP as a response to the TDLS setup request message, wherein the TDLS setup request message and TDLS setup response message are encapsulated as data frames in order to allow the TDLS setup request message and TDLS setup response message to be transmitted through the AP transparently, wherein the TDLS setup request message includes a first mode field indicating whether the requesting station supports that a bandwidth of the TDLS direct link is wider than a bandwidth of the BSS, wherein the TDLS setup response message includes a second mode field indicating whether the responding station supports that the bandwidth of the TDLS direct link is wider than the bandwidth of the BSS, and wherein the bandwidth of the TDLS direct link is used for communication between the requesting station and the responding station via the TDLS direct link and the bandwidth of the BSS is used for communication between the AP and the requesting station or between the AP and the responding station; and only if both the first mode field and the second mode field indicate that a corresponding station supports that the bandwidth of the TDLS direct link is wider than the bandwidth of the BSS, communicating, by the responding station, with the requesting station via a wider bandwidth on the TDLS direct link than on the BSS.

* * * * *